(12) United States Patent
Cho et al.

(10) Patent No.: US 10,167,209 B2
(45) Date of Patent: Jan. 1, 2019

(54) SYSTEM AND METHOD FOR DISINFECTION AND FOULING PREVENTION IN THE TREATMENT OF WATER

(71) Applicants: Young I. Cho, Cherry Hill, NJ (US); Alexander Fridman, Philadelphia, PA (US); Daniel J. Cho, Wayne, PA (US); Alexander Rabinovich, Cherry Hill, NJ (US)

(72) Inventors: Young I. Cho, Cherry Hill, NJ (US); Alexander Fridman, Philadelphia, PA (US); Daniel J. Cho, Wayne, PA (US); Alexander Rabinovich, Cherry Hill, NJ (US)

(73) Assignee: DREXEL UNIVERISITY, Philadelphia, PA (US)

( * ) Notice: Subject to any disclaimer, the term of this patent is extended or adjusted under 35 U.S.C. 154(b) by 462 days.

(21) Appl. No.: 14/954,495

(22) Filed: Nov. 30, 2015

(65) Prior Publication Data

US 2016/0152494 A1 Jun. 2, 2016

Related U.S. Application Data

(60) Provisional application No. 62/085,909, filed on Dec. 1, 2014.

(51) Int. Cl.
*C02F 1/48* (2006.01)
*C02F 1/46* (2006.01)

(52) U.S. Cl.
CPC ............ *C02F 1/487* (2013.01); *C02F 1/4608* (2013.01); *C02F 2303/04* (2013.01); *C02F 2305/023* (2013.01)

(58) Field of Classification Search
CPC .... C02F 1/4608; C02F 1/487; C02F 2303/04; C02F 2305/023; C02F 1/48; A61L 2/18; B01J 19/08
See application file for complete search history.

(56) References Cited

U.S. PATENT DOCUMENTS 3,035,992 A 5/1962 Hougen
4,278,522 A 7/1981 Jacob et al.
(Continued)

FOREIGN PATENT DOCUMENTS

EP 1293481 B1 2/2007

OTHER PUBLICATIONS

Kim, W., Cho, D. J., & Cho, Y. I. (2011). Use of RF electric fields for simultaneous mineral and bio-fouling control in a heat exchanger. International Communications in Heat and Mass Transfer, 38(8), 1003-1007.
(Continued)

*Primary Examiner* — Walter D. Griffin
*Assistant Examiner* — Cameron J Allen
(74) *Attorney, Agent, or Firm* — Mendelsohn Dunleavy, P.C.

(57) ABSTRACT

A treatment system for treating water, such as produced water that is produced during hydraulic fracturing. The system employs a combination of a plasma spark discharge and an RF oscillating electric field. The plasma spark discharge and the RF oscillating electric field may be employed simultaneously or in an overlapping manner within a chamber to treat the water. The treatment system is able to kill microorganisms as well as reduce or eliminate fouling due to, for example, bicarbonates. In some embodiments, grids are employed to further enhance the heat produced by the RF oscillating electric field.

16 Claims, 11 Drawing Sheets

(56) References Cited

U.S. PATENT DOCUMENTS

| | | | |
|---|---|---|---|
| 5,152,341 | A | 10/1992 | Kasevich |
| 5,858,202 | A | 1/1999 | Nakamura |
| 6,099,703 | A | 8/2000 | Syversen et al. |
| 6,984,295 | B2 | 1/2006 | Shiue et al. |
| 7,090,753 | B2 | 8/2006 | Sumita |
| 7,419,603 | B2 | 9/2008 | Cho |
| 8,277,634 | B2 * | 10/2012 | Chen .................. B82Y 30/00 205/618 |
| 8,771,499 | B2 | 7/2014 | McCutchen et al. |
| 8,784,657 | B2 | 7/2014 | Cho et al. |
| 2001/0035342 | A1 * | 11/2001 | Morse .................. B01J 19/087 204/164 |
| 2004/0069618 | A1 * | 4/2004 | Paskalov .................. A61L 2/18 204/193 |
| 2008/0277272 | A1 * | 11/2008 | Pierce .................. B01J 19/088 204/164 |
| 2012/0318671 | A1 | 12/2012 | McCutchen et al. |
| 2013/0062188 | A1 | 3/2013 | Dighe |
| 2013/0062191 | A1 | 3/2013 | Dighe |

OTHER PUBLICATIONS

Cho, Y. I., Lee, S., Kim, W., & Suh, S. (2003). Physical water treatment for the mitigation of mineral fouling in cooling-tower water applications.

* cited by examiner

SYSTEM AND METHOD FOR DISINFECTION AND FOULING PREVENTION IN THE TREATMENT OF WATER

STATEMENT OF GOVERNMENT INTEREST

This invention was made with government support under DOE Contract No. DE-AC26-07NT42677 awarded by the Department of Energy's National Energy Tech Laboratory. The government has certain rights in the invention.

BACKGROUND OF THE INVENTION

1. Field of the Invention

The present invention is directed to water treatment. In particular the present invention is directed to the field of water treatment using clean technology.

2. Description of the Related Technology

Water in processes such as the hydraulic fracturing of shale can contain high concentrations of microorganisms and dissolved inorganic solids. Examples of such water, includes fracking water, flowback water obtained during the drilling phase, and produced water obtained during the production phase. In particular, mineral ions such as calcium and magnesium can cause mineral fouling in the form of calcium and magnesium salts. These mineral salts form hard scale in industrial equipment, such as pumps and heat exchangers, reducing the performance of the equipment.

Fouling is a major challenge in the treatment of produced water. This problem can affect all water-bearing industrial equipment including pumps and heat exchangers. Various chemicals such as acids, lime ($Ca(OH)_2$), caustics (NaOH), chelating agents (citric acid and EDTA), phosphonates, and polyacrylamides, among others, are used to treat water so that mineral fouling can be prevented. These chemicals have environmental disadvantages.

Chlorine and ozone are employed in some conventional methods for disinfection of water containing microorganisms. The use of chlorine has environmental disadvantages. Ozone has the disadvantage of high cost because this method requires a compressor and an ozone injection facility. This equipment increases energy costs as well as capital costs. Ultraviolet light (UV) lamp is also sometimes used for treatment of bacterial disinfection and low turbidity water.

Therefore, there is a need for a method and system for treating water that has a low environmental impact as well as a low cost.

SUMMARY OF THE INVENTION

An aspect of the present invention may be a treatment system comprising: a chamber; an inlet to the chamber for water to enter the chamber; a cathode and anode located within the chamber for applying a plasma spark discharge to the water; at least two electrodes located in the chamber for applying an RF oscillating energy field to the water; and an outlet from the chamber for the water to exit the chamber.

Another aspect of the present invention may be a method of treating water comprising steps of applying a plasma spark discharge to the water and applying an RF oscillating electric field to the water.

Still yet another aspect of the present invention may be a treatment system comprising: an inlet for receipt of liquid; a cathode and an anode located for applying a plasma spark discharge to contents a liquid; and at least two electrodes for applying an RF oscillating energy field within the chamber; and an outlet for removal of liquid.

DETAILED DESCRIPTION OF THE PREFERRED EMBODIMENT(S)

Figure 1A:
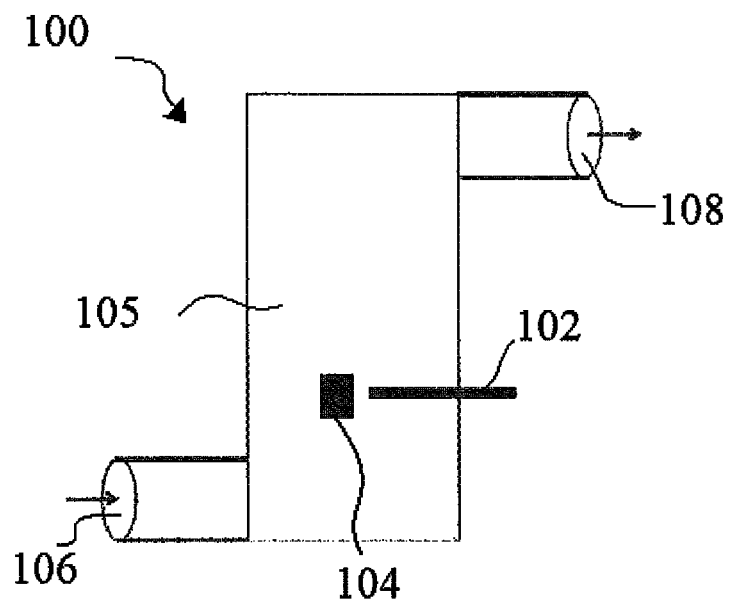
FIG. 1A is schematic side view of a plasma spark discharge reactor in accordance with an embodiment of the present invention.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

As used herein "produced water" refers to the water that comes out of shale wells during the production of oil or gas, through a drilling process called hydraulic fracking.

As used herein "Stochastic heating" herein refers to the heating that results from a combination of the RF oscillating electric field and the plasma spark discharge.

The present invention comprises a system and method of treatment of water such as produced water, which sterilizes, eradicates or neutralizes microorganisms in water while also reducing or preventing mineral fouling. The present invention utilizes plasma spark discharge instead of scale-inhibiting chemicals to reduce or prevent mineral fouling. Bicarbonate ions are dissociated by the plasma spark discharge, leading to the removal of the bicarbonate ions from the water or produced water. The bicarbonate ions are an essential building block of mineral fouling and scale.

Furthermore, in the present invention a radio frequency (RF) oscillating electric field is also applied to the water or produced water. The RF oscillating field may dissociate at least some bicarbonate ions via a heterogeneous surface catalytic effect. By using a combination of a plasma spark discharge and an RF oscillating electric field a synergistic effect is created during the treatment process that enhances the removal of bicarbonate ions, flocculates calcium ions, and neutralizes microorganisms.

The treatment system 300 may include a combination of a plasma spark discharge reactor 100 and an RF oscillating electric field generator 200. Features of the plasma spark discharge reactor 100 and the RF oscillating electric field generator 200 are used in the treatment system 300 which applies both a plasma spark discharge and an RF oscillating electric field to water or produced water.

Figure 1B:
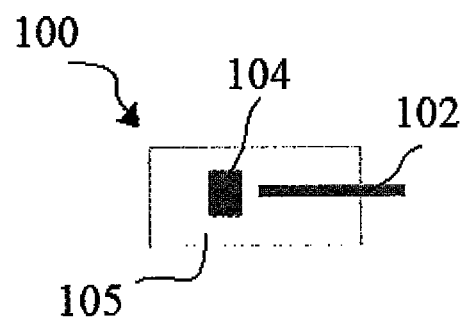
FIG. 1B shows a schematic top down view of the plasma spark discharge reactor shown in FIG. 1A.

Referring to FIGS. 1A and 1B, a plasma spark discharge reactor 100 is shown. The plasma spark discharge reactor 100 comprises two electrodes, an anode 102 and a cathode 104. The cathode 104 may be made of stainless steel. The anode 102 may be made of tungsten, or another metal, such as stainless steel. The cathode 104 may have a thickness of 1 cm or greater. The anode 102 and cathode 104 are located in chamber 105 of the plasma spark discharge reactor 100. One of the anode 102 and cathode 104 is a high voltage electrode while the other may be a ground electrode. The ground electrode may be form part of the chamber 105.

The chamber 105 may be made of stainless steel and may be cylindrically shaped. A preferred distance between the anode 102 and cathode 104 within the chamber 105 may be between 0.01 mm and 100 mm, a more preferable distance between the anode 102 and cathode 104 may be 1 mm to 10 mm, and an even more preferable distance between the anode 102 and cathode 104 may be between 3-7 mm.

The diameter of the chamber 105 of the plasma spark discharge reactor 100 is preferably greater than the diameter of inlet 106. Further, the diameter of the chamber 105 is also preferably greater than the diameter of outlet 108. Inlet 106 is employed to feed the water to be treated into the chamber 105. Outlet 108 allows treated water to exit from the chamber 105. A preferred diameter for the chamber 105 may be between 1 and 10 inches, a more preferred range for the chamber 105 is between 2 and 8 inches and a more preferred diameter for the chamber 105 may be between 4 to 6 inches. A preferred range for the diameter of the inlets 106 and outlets 108 may be between 0.5 to 4 inches, a more preferred range for the diameter for the inlets 106 and outlets 108 may be between 1 and 2 inches. With a diameter of 3 to 4 inches for the inlets 106 and outlets 108 the flow rate increases. Preferably the diameter of the chamber 105 is such that the water that enters into the chamber 105 remains in the chamber 105 for a substantial amount of time. The longer the residence time in the chamber 105, the better performance of plasma treatment. In the plasma spark discharge reactor 100 the residence time is between 2-5 s.

The plasma spark discharge reactor 100 sterilizes water and reduces or prevents mineral fouling of water, such as the fouling that is often found in produced water. The plasma spark discharge reactor 100 produces active species such as $OH^-$, $O_2^-$, $O_3$, $H_2O_2$, UV, shock waves, and electric fields as a result of supplying energy to the anode(s) 102 and cathode(s) 104. The supplied energy may come from any energy source that is capable of supplying sufficient energy to generate the plasma spark discharge.

Among these produced active species, $OH^-$, $O_2^-$, $O_3$, $H_2O_2$, and UV are effective in the sterilization of water. However, $OH^-$, $O_2^-$, $O_3$ have short half-lives and the benefits provided by these species are restricted to regions near the plasma spark discharge. The half-life of $H_2O_2$ is relatively long (i.e., >10 min), and thus the benefits of $H_2O_2$ is expected extend a substantial distance from the plasma spark discharge. UV can also propagate some distance within the chamber 105 as long as the water is at least substantially transparent the effective distance of plasma treatment, for example UV treatment, depends on the clearness of water. In case of very clear water, the distance can be as large as 10-20 cm, whereas in case of dark-colored water (produced water from shale oil production) the effective distance of plasma treatment can be as short as 1 cm or less.

Figure 2A:
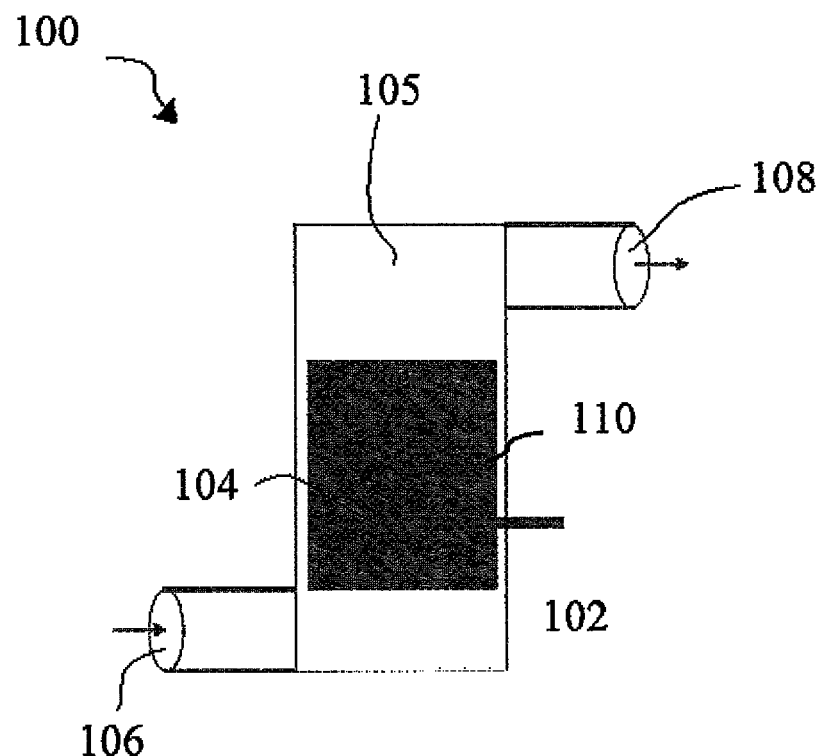
FIG. 2A is a schematic side view of a plasma spark discharge reactor that has a plate surrounding the anode and cathode in accordance with an embodiment of the present invention
Figure 2B:
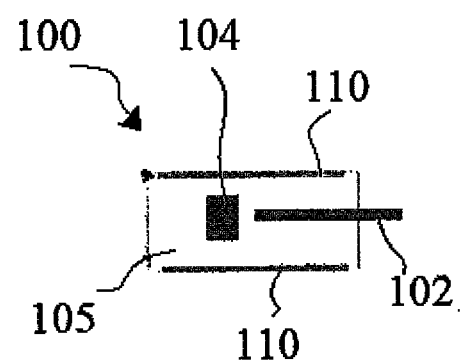
FIG. 2B is a schematic top down view of the plasma spark discharge reactor shown in FIG. 2A.

Referring to FIGS. 2A and 2B, an embodiment of the plasma spark discharge reactor 100 is shown that employs a plate 110 surrounding the anode 102 and cathode 104 that produce the plasma spark discharge. The plate 110 shown in in FIGS. 2A and 2B is preferably made of titanium dioxide ($TiO_2$). UV and $TiO_2$ can act together to sterilize microorganisms in water. However, other materials may be used for the plate as well.

The shock waves produced by the plasma spark discharge reactor 100 can propagate within the chamber 105. The shock waves produce a powerful force on the suspended particles, such as microorganisms. Upon the impact of the shock waves, the shear force produced by the shock waves may rupture the cell membranes of microorganisms to kill the microorganism and facilitate sterilization of the water.

The plasma spark discharge also produces intense local heating that both sterilizes and helps reduce or prevent fouling of the water. In order to estimate the benefit of the intense local heating produced by the plasma spark discharge in the precipitation of calcium ions reaction 1 (see reference [1]) shown below is used.

$$HCO_3^-(aq) \Leftrightarrow OH^-(aq) + CO_2(g) \quad \text{(reaction 1)}$$

The $OH^-$ concentration can be calculated from both the volume heating and local heating. The amount of $OH^-$ which can be produced from reaction 1 per unit time is calculated using equation (2) (see reference [2]):

$$n_{OH^-} = n_{HCO_3^-} \times k \quad (2)$$

where $n_{HCO_3^-}$ is the number of $HCO_3^-$ ions participating in reaction 1, and k is the reaction rate coefficient. According to the Arrhenius equation (3), the reaction rate coefficient k becomes (see reference [3]):

$$k = Ae^{-E_a/T} \quad (3)$$

where $E_a$ is activation energy, and T is the system temperature (in the units of eV). Due to the exponential curve of the equation, the Arrhenius equation indicates that higher water temperatures induce a faster reaction. Hence, since the spark discharge produces a very intense local heating of a small volume of water around the tips of anode 102 and cathode 104 the reaction 1 proceeds at a high rate in this treatment area.

The plasma spark discharge dissociates $HCO_3^-$ ions without expending a large amount of electrical energy. Below, two cases are examined, volume heating and local heating, to demonstrate that local heating via plasma spark discharge produces more $OH^-$ using the same amount of energy spent by volume heating.

In case 1, that of volume heating, it is assumed that to heat the entire volume of water by one degree (e.g. from 300 K to 301 K), the number of $OH^-$ ions that can be produced for $E_a$~1 eV is described by equation (4) below (see reference [3]:

$$n_{OH^-} = n_{HCO_3^-} \times k = n_{HCO_3^-} \times Ae^{-E_a/T} = An_{HCO_3^-} e^{-11000/301} = e^{-36.5} An_{HCO_3^-} \quad (4)$$

In case 2, for local heating using plasma spark discharge, it is assumed that to heat 1% of the entire water volume by 100 degrees (e.g. from 300 K to 400 K), the number of $HCO_3^-$ ions participating in the reaction is 1%, i.e., $n'_{HCO_3^-} = 0.01 \times n_{HCO_3^-}$. Because plasma spark discharge is assumed to heat only 1% of the total water volume, the number of $OH^-$ ion that can be produced for $E_a \approx 1$ eV is described by equation (5) below (see reference [3]):

$$n'_{OH^-} = n'_{HCO_3^-} \times k' = n'_{HCO_3^-} \times Ae^{-E_a/T} = 0.01 An_{HCO_3^-} e^{-11000/400} = 0.01 e^{-27.5} An_{HCO_3^-} = e^{-32} An_{HCO_3^-} \quad \text{Equation (5)}$$

Comparing the number of the hydroxyl ions produced for the two cases, i.e., $n_{OH^-}$ and $n'_{OH^-}$, it can be seen that local heating by plasma spark discharge produces about 100 times more $OH^-$ ions per unity energy than volume heating. Therefore, it is estimated that plasma spark discharge will be 100 times more energy efficient in precipitating dissolved calcium ions from hard water.

Radio-frequency oscillating electric fields also assist in preventing both mineral fouling and bio-fouling in water (see reference [4]). Shown in FIGS. 3A and 3B, an RF oscillating electric field (RF OEF) generator 200 is shown. The RF OEF generator 200 utilizes electrodes 207 to generate radio-frequency oscillating electric fields in water. The water enters the chamber 205 through inlet 206 and exits through outlet 208. Energy is supplied to the electrodes 207 from any energy generating source that is capable of supplying sufficient energy to generate the RF oscillating field.

Figure 3A:
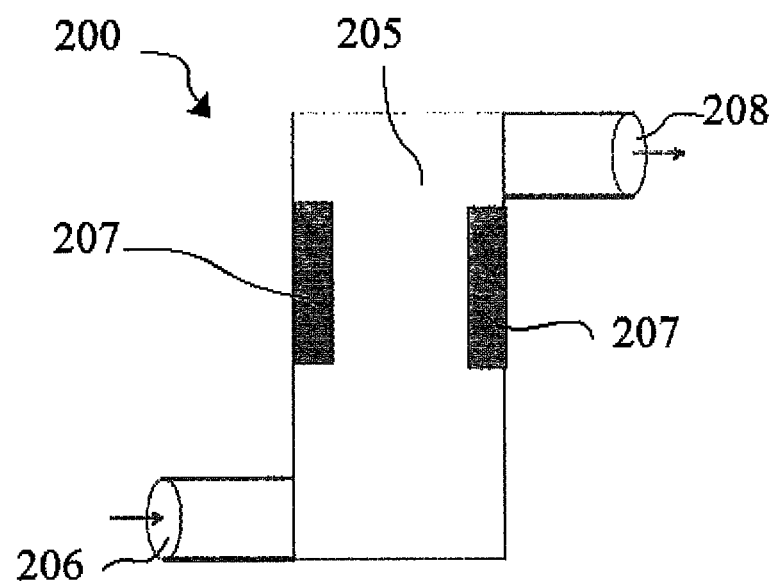
FIG. 3A shows a schematic side view of a reactor equipped with an RF oscillating electric field generator.
Figure 3B:
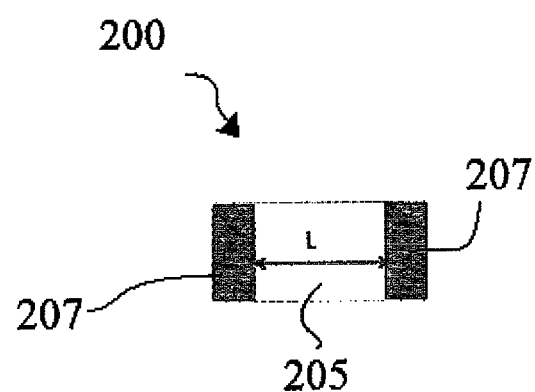
FIG. 3B shows a schematic top down view of the reactor shown in FIG. 3A.

FIGS. 3A and 3B show two electrodes 207 that are plate-type electrodes. Other shapes for the electrodes 207 may include wire-shaped, rod-shaped, and a curved plate. The electrodes 207 may be made of stainless steel. However, the electrodes 207 can be made of other conducting materials such as copper, aluminum, silver, graphite, a ceramic with metal coating, or a polymer with metal coating. The electrodes 207 are positioned inside the chamber 205, and in the embodiment shown are positioned in the water located within the chamber 205.

Figure 4A:
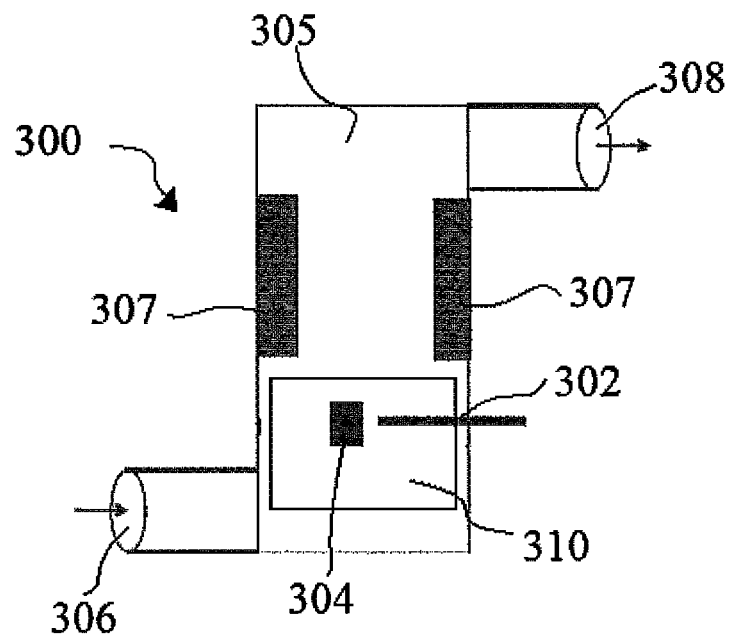
FIG. 4A shows a schematic side view of a treatment system in accordance with an embodiment of the present invention.
Figure 4B:
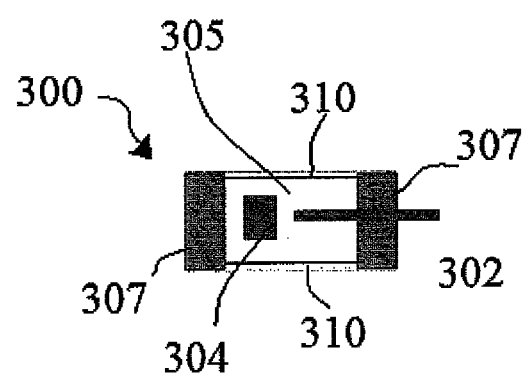
FIG. 4B is a top down view of the treatment system shown in FIG. 4A.

An exemplary embodiment of the treatment system 300 is shown in FIGS. 4A and 4B. The treatment system 300 employs aspects of both the plasma spark discharge reactor 100 and the RF OEF reactor 200, discussed above. It should be understood that features discussed as optional or alternative in the plasma spark discharge reactor 100 and RF OEF generator 200 may also be employed in the water treatment system 300. It should also be understood that similarly numbered elements used to describe the plasma spark discharge reactor 100 and the RF OEF generator 200 are comparable to the elements of the system 300 described below. The treatment system 300 shown in FIG. 4A comprises an anode 302, a cathode 304, a chamber 305, an inlet 306, an outlet 308, electrodes 307 and a plate 310, which is optional.

In the treatment system 300, anode 302 and cathode 304 generate a plasma spark discharge with a short pulse duration, which may be between 1 to 1000 ns, and preferably between 10-100 ns.

In conjunction with the plasma spark discharge, electrodes 307 generate an RF oscillating electric field that is superimposed on the same location as where the plasma spark discharge is generated. The plasma spark discharge works in conjunction with the RF oscillating electric field to create stochastic heating. Stochastic heating generates highly localized, focal regions of heat and other active species such as, for example, OH—, O2-, O3, $H_2O_2$, UV and electric fields in the treated water.

The RF oscillating electric field that is generated is typically a high-frequency oscillating electric field and is preferably generated at radio frequencies, such as 13.56 or 27.12 MHz though other frequencies can be used, if desired. The RF oscillating electric field is superimposed on the plasma spark discharge so that the water treated by the plasma spark discharge is simultaneously exposed to the RF oscillating electric field and the plasma spark discharge. The UV and other active species generated by the plasma spark discharge kill or neutralize microorganisms in water. The plasma spark discharge is generated using the anode 302 and cathodes 304 optionally further assisted by, for example, a titanium dioxide plate 310 shown in the embodiment of FIGS. 4A and 4B. Plate 310 is preferably located proximate to at least one set of anodes and cathodes. A preferred distance may be between 0.5-10 cm, a more preferred distance may be 1-5 cm.

The electrodes 307, anodes 302 and cathodes 304 are supplied with energy that may come from any energy generating source or sources that are capable of supplying sufficient energy to generate a plasma spark discharge and/or an RF oscillating field.

Furthermore, when the RF oscillating electric field and the plasma spark discharge are superimposed, the RF oscillating electric field can provide additional heating to the bicarbonate ions causing more efficient dissociation and anti-fouling effects. The stochastic heating that occurs as a result of the synergistic effect of the plasma spark discharge and RF oscillating electric field, causes both disinfection and water de-fouling.

Advantages of the treatment system 300 are that it is a non-chemical system and it functions as a clean technology. Treatment system 300 is also an energy-efficient system for both disinfection and water softening in the form of fouling prevention. The plasma spark discharge can be produced at an energy consumption rate of about 100 J/L and the RF oscillating electric field can also be generated using an amount of energy less than about 100 J/L.

Figure 5:
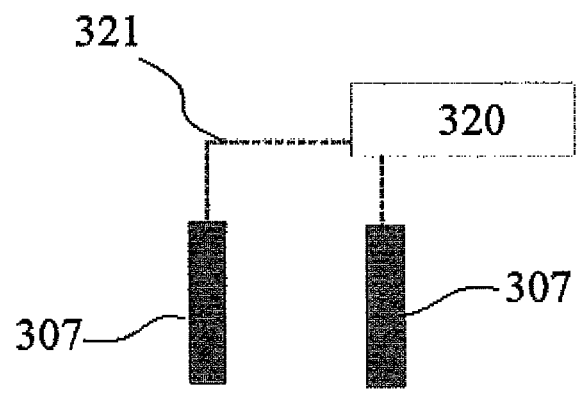
FIG. 5 is an electrical diagram of an RF oscillating electric field generator of the treatment system.

FIG. 5 is a schematic of an electrical diagram showing that RF oscillating electric fields can be produced between two electrodes 307 connected to a power supply 320 by wires 321. The power supply 320 is capable of generating an RF oscillating electric field in water (i.e., at a frequency >1 MHz).

Figure 6:
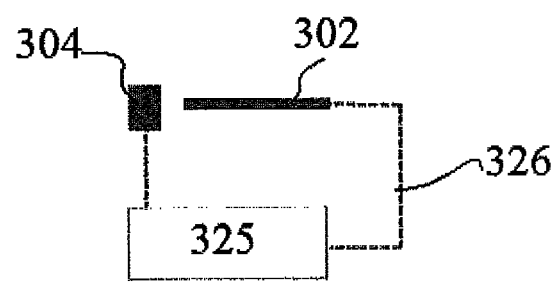
FIG. 6 is an electrical diagram of the plasma spark discharge reactor of the treatment system.

FIG. 6 is a schematic of an electrical diagram showing that the plasma spark discharge may be produced between an anode 302 and a cathode 304 connected to a power supply 325 via wires 326. The power supply 325 is capable of generating pulses having durations in the nano-second range. The preferred range for the spark discharge pulses is pulses having durations of 10-20 microseconds in water which has a high electric conductivity >4 [mS/cm]. The anode 302 may be, for example, a needle-type metal wire or rod with a sharp tip 303, whereas the cathode 304 may be, for example, a plate.

A voltage of about 10-30 kV is applied to anode 302 and cathode 304 to produce the plasma spark discharge. Since the cathode 304 tends to overheat due to a phenomenon called the cathodic hot spot (reference [2]), reaching approximately 3000 K, the cathode 304 is preferably made of a relatively thick plate that comprises refractory materials, such as carbon, tungsten, molybdenum, and zirconium in order to be able to withstand such high temperatures. The cathode 304 is preferably fabricated to conduct heat away from the arc and thus withstand the repeated high temperature condition to which it is exposed. However, the anode 302 may not be exposed to high temperatures. Hence, the anode 302 can be made of, for example, stainless steel wire or rod.

Figure 7:
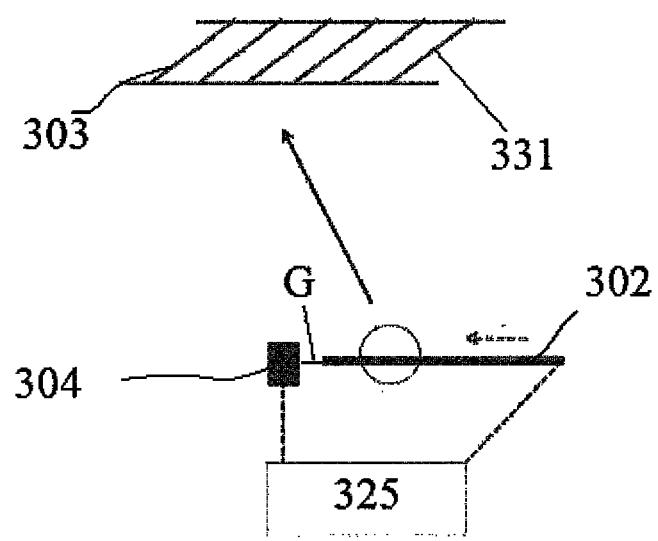
FIG. 7 is a schematic of an electric diagram of a plasma spark discharge reactor of the treatment system with a close-up view of an anode.

In the treatment system 300, preferably anode 302 has a rounded edge at its tip 303 to ensure a stable spark discharges over time. Thus, in some embodiments, preferably, treatment system 300 can be provided with the ability to maintain the roundness of the tip of the anode 302. FIG. 7 is a schematic of an electrical diagram and close-up view of an embodiment of the anode 302. The anode 302 may be a pre-cut rod or wiring having one or more cuts or areas of reduced thickness 331 so that a portion of used tip 303 may periodically break off along the cut or area of reduced thickness 331 to automatically provide a new sharp tip 303.

Additionally, in many embodiments, it is important to maintain the optimum gap distance, G, between the anode 302 and cathode 304 for stable plasma spark discharge over time. Preferably the optimum gap distance G between the anode 302 and cathode 304 may be maintained by periodically moving the anode 302 toward the cathode 304, e.g. particularly each time a new tip 303 is generated in the manner discussed above. This adjustment of the gap distance G can be done by indirectly monitoring the distance between the anode 302 and cathode 304 by measuring the resistance variation over time. For example, as the gap distance G increases, the resistance between the anode 302 and cathode 304 will increase. By monitoring the resistance changes, one can determine an appropriate time to adjust the gap distance G. Furthermore, the amount of the adjustment can be fine-tuned based on the measured resistance between the anode 302 and cathode 304.

Figure 8A:
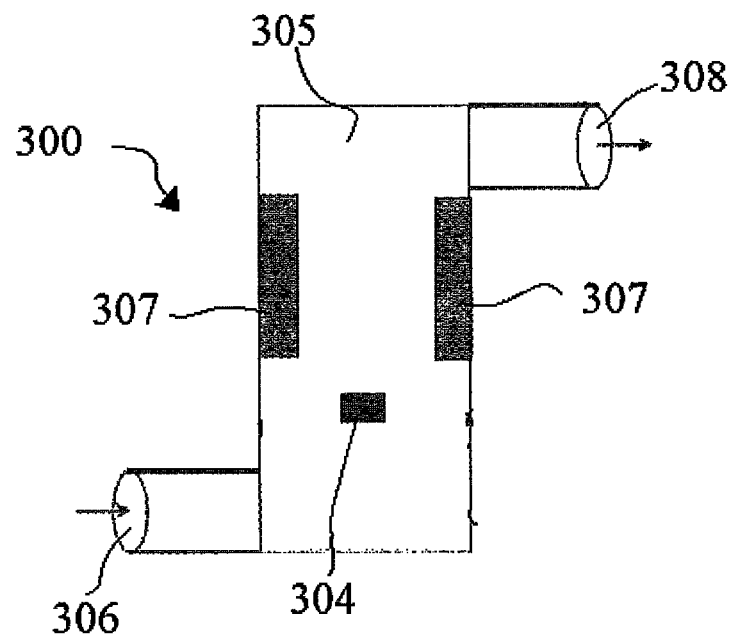
FIG. 8A shows a schematic side view of an alternative embodiment of an arrangement of the anode and cathode for providing a spark discharge and the two electrodes for providing RF oscillating electric fields.
Figure 8B:
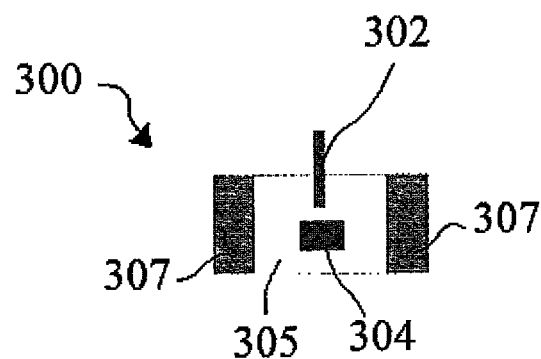
FIG. 8B is a top down view of the embodiment shown in FIG. 8A.

FIGS. 8A and 8B show an alternative embodiment of an arrangement of the anode 302 and cathode 304 for providing a plasma spark discharge relative to the two electrodes 307 used for generating an RF oscillating electric field. In the embodiment shown in FIGS. 8A and 8B the anode 304 is orthogonal to the orientation shown in FIGS. 4A and 4B. In other words, in FIG. 4B the anode 304 is parallel to the long dimension of electrode 307, as shown, and in FIG. 8B the anode 304 is perpendicular to the long dimension of the electrode 307, as shown.

Figure 9A:
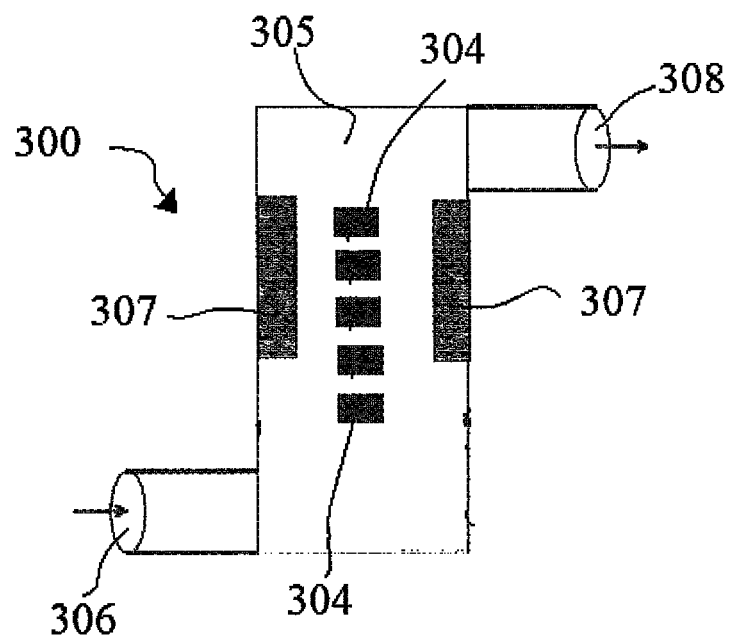
FIG. 9A shows a schematic side view of a treatment system using multiple anodes and cathodes.
Figure 9B:
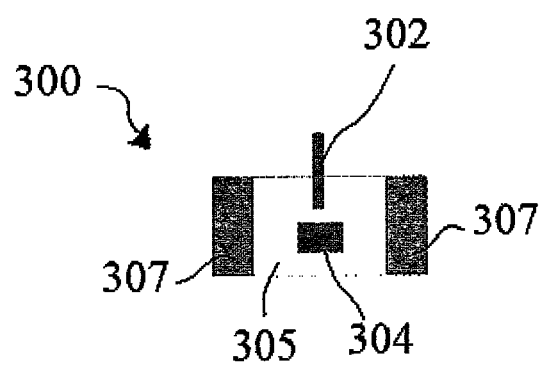
FIG. 9B shows a schematic top down view of the treatment system shown in FIG. 10A.

FIGS. 9A and 9B show an alternative embodiment of the treatment system 300 where multiple sets of anodes 302 and cathodes 304 are used in order to provide multiple plasma spark discharges in combination with the RF oscillating electric field in order to produce the stochastic heat. The use of multiple sets of anodes 302 and cathodes 304 can provide additional cleaning functionality to the treatment system 300 and/or be used to increase the throughput of the treatment system 300.

Figure 10A:
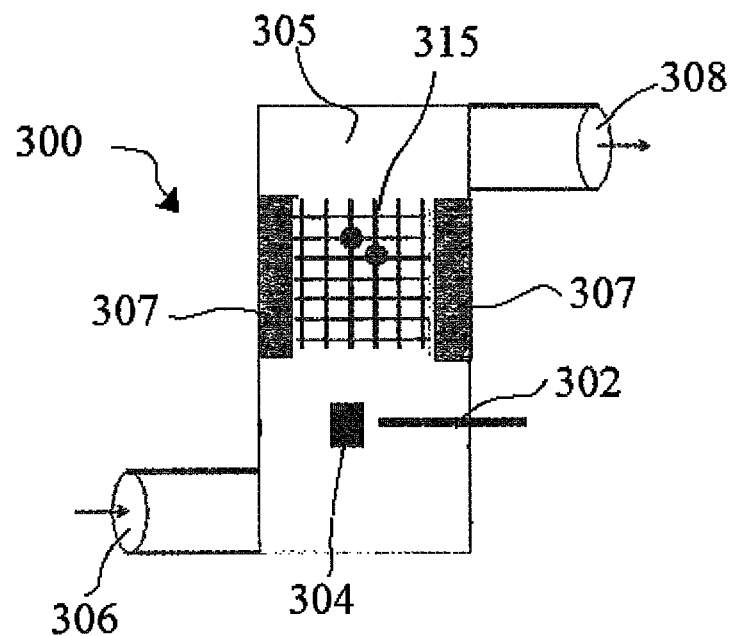
FIG. 10A shows a schematic side view of a treatment system using a grid.
Figure 10B:
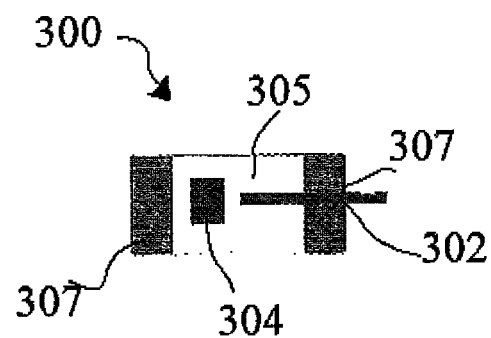
FIG. 10B shows a schematic top down view of the treatment system shown in FIG. 10A.
Figure 12:
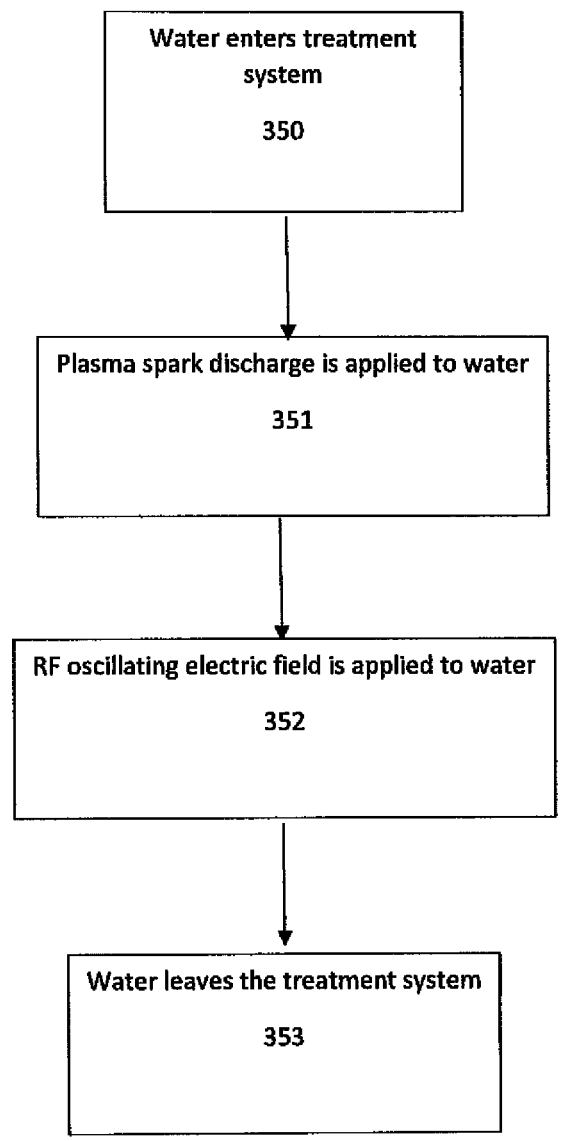
FIG. 12 is a flow chart showing a method of treating water according to an embodiment of the present invention.

FIGS. 10A and 10B show an embodiment of the treatment system 300 that has a grid 315 placed between the electrodes 307 that are used to generate the RF oscillating electric field. FIG. 12 shows a close up view of the grid 315 that is used in FIGS. 10A and 10B. The grid 315 is preferably made of a polymer material. However other materials may be used such as metal, etc. The grid 315 may have particles 316 that are attached to the connection points 317 of the grid 315. The particles 316 may be, for example, small metal particles, such as metal beads or rings. These particles 316 may act as local heating centers for the RF oscillating electric field. Hence, the energy from RF oscillating electric field can be more effectively transferred to water via the use of the particles 316 located the water. The particles 316 may typically have a higher conductivity than the connectors 317.

Figure 11:
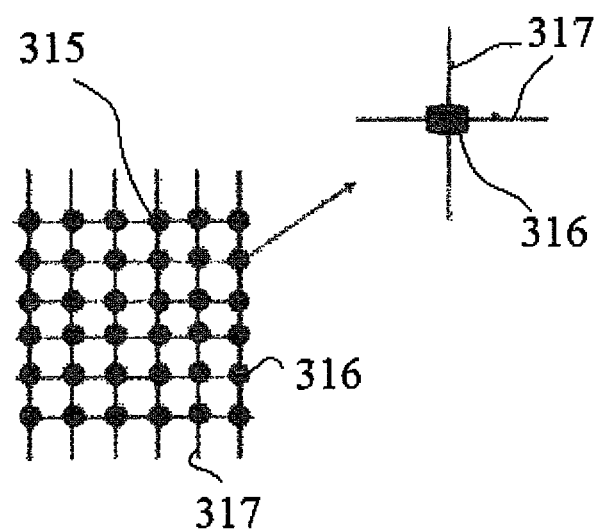
FIG. 11 is close up view of the grid shown in FIGS. 10A and 10B.

FIG. 11 shows that the grid 315 is formed as a series of interconnected squares. However, other arrangements for the particles 316 and the connectors 317 may be employed. For example, connectors 317 and particles 316 may be arranged concentrically. Additionally, particles 316 may be placed at various locations on the connectors 317 and not at the intersections of connectors 317.

FIG. 12 is a flow chart that sets out a method of treating water using the treatment system 300 described herein. In step 350, water enters the treatment system 300. The water that enters the treatment system 300 enters through the inlet 306. In step 351 a plasma spark discharge is applied to the water via the anode 302 and cathode 304. In step 352, which may be performed prior to, after or simultaneously with step 351, an RF oscillating electric field is applied to the water via the electrodes 307. Steps 351 and 352 are preferably performed simultaneously or at least in an overlapping manner in order to achieve some of the particular advantages described above. In some embodiments, steps 351 and 352 may overlap for a time and one of the steps 351, 352 may also be initiated prior to the other of the steps 351, 352 or terminated after the other of the steps 351, 352. In step 353, the water leaves the treatment system via outlet 308. As a result of the combined effect of the spark discharge and RF electric field, both disinfection and water softening in the form of mineral fouling reduction or prevention can be achieved.

It is to be understood, however, that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

All documents mentioned herein are hereby incorporated by reference in their entirety or alternatively to provide the disclosure for which they were specifically relied upon.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The applicant(s) do not intend to dedicate any disclosed embodiments to the public, and to the extent any disclosed modifications or alterations may not literally fall within the scope of the claims, they are considered to be part hereof under the doctrine of equivalents.

The following references are provided and included herein by reference.

[1] V. L. Snoeyink and D. Jenkins, *Water chemistry*. New York: John Wiley, 1980.
[2] A. Fridman and L. Kennedy, *Plasma Physics and Engineering*. New York: Taylor & Francis Group (2nd ed.), 2011.
[3] D. R. Lide and T. J. Bruno, *CRC handbook of chemistry and physics*: CRC PressI Llc, 2012.
[4] W. Kim, D. J. Cho, and Y. I. Cho, "Use of RF electric fields for simultaneous mineral and bio-fouling control in a heat exchanger," *International communications in heat and mass transfer*, vol. 38, pp. 1003-1007, 2011.
[5] Y. I. Cho, A. F. Fridman, S. H. Lee, and W. T. Kim, "Physical water treatment for fouling prevention in heat exchangers," *Advanced Heat Transfer*, vol. 38, pp. 1-72, 2004.

What is claimed is:

1. A treatment system comprising:
a chamber having an inlet and an outlet;
a cathode and an anode located within the chamber for applying a plasma spark discharge to contents of the chamber; and
at least two electrodes located in the chamber for applying an RF oscillating energy field within the chamber.

2. The treatment system of claim 1, further comprising a grid located between the at least two electrodes.

3. The treatment system of claim 2, wherein the grid comprises a plurality of connectors and a plurality of particles located at intersections of the connectors.

4. The treatment system of claim 3, wherein the connectors are made of a polymer material.

5. The treatment system of claim 4, wherein the particles are more conductive than the connectors.

6. The treatment system of claim 1, comprising a plurality of the cathodes and the anodes for applying the plasma spark discharge to the water.

7. The treatment system of claim 1, further comprising a plate located proximate to the anode and the cathode.

8. The treatment system of claim 7, wherein the plate is made of $TiO_2$.

9. The treatment system of claim 1, wherein the anode is rod-shaped and the cathode is plate-shaped.

10. The treatment system of claim 1, where the anode is rod-shaped and comprises a tip of reduced diameter relative to another portion of the anode, and wherein the anode further comprise one or more lines of weakness positioned to provide a new tip when a portion of the anode breaks off along one said line of weakness.

11. The treatment system of claim 1, wherein at least one of the anode, the cathode and the electrodes form a portion of the chamber.

12. A method of treating water comprising;
applying a plasma spark discharge to the water; and
applying an RF oscillating electric field to the water;
wherein the step of applying the plasma spark discharge and the step of applying the RF oscillating electric field overlap in time.

13. The method of claim 12, wherein the RF oscillating electric field has a frequency of 10-30 Mhz.

14. The method of claim 12, wherein the RF oscillating electric field is has a frequency of either 13.56 Mhz or 27.12 Mhz.

15. The method of claim 12, wherein the step of applying the plasma spark discharge to the water is performed using an anode and cathode located within a chamber.

16. The method of claim 12, wherein the step of applying the RF oscillating electric field is performed by at least two electrodes located within a chamber.

\* \* \* \* \*